United States Patent
Erdner et al.

(10) Patent No.: US 6,950,904 B2
(45) Date of Patent: Sep. 27, 2005

(54) CACHE WAY REPLACEMENT TECHNIQUE (75) Inventors: Todd D. Erdner, Austin, TX (US);
Bradley G. Burgess, Austin, TX (US);
Heather L. Hanson, Austin, TX (US)

(73) Assignee: Intel Corporation, Santa Clara, CA (US)

(*) Notice: Subject to any disclaimer, the term of this patent is extended or adjusted under 35 U.S.C. 154(b) by 197 days.

(21) Appl. No.: 10/180,700

(22) Filed: Jun. 25, 2002

(65) Prior Publication Data
US 2003/0236948 A1 Dec. 25, 2003

(51) Int. Cl.[7] .............................................. G06F 12/08
(52) U.S. Cl. ..................................... 711/136; 711/134
(58) Field of Search ................................ 711/136, 134

(56) References Cited

U.S. PATENT DOCUMENTS

| | | | | |
|---|---|---|---|---|
| 5,325,511 A | * | 6/1994 | Collins et al. | 711/128 |
| 5,845,320 A | * | 12/1998 | Pawlowski | 711/136 |
| 2002/0042887 A1 | * | 4/2002 | Chauvel et al. | 713/300 |

* cited by examiner

*Primary Examiner*—Mano Padmanabhan
*Assistant Examiner*—Midys Inoa
(74) *Attorney, Agent, or Firm*—Erik M. Metzger (57) ABSTRACT

A cache way replacement technique to identify and replace a least-recently used cache way. A cache way replacement technique in which a least-recently used cache way is identified and replaced, such that the replacement of cache ways over time is substantially evenly distributed among a set of cache ways in a cache memory. A least-recently used cache way is identified in a cache memory having a non-binary number of cache ways.

40 Claims, 6 Drawing Sheets

SIX-WAY HYBRID TREE OF TRUE LRU AND PSEUDO-LRU

FIG. 1
(PRIOR ART)

FOUR-WAY PSEUDO-LRU TREE

SIX-WAY HYBRID TREE OF TRUE LRU AND PSEUDO-LRU

UPDATE LRU BRANCH HISTORY 605

| TOP-LEVEL BRANCH OF ACCESSED WAY | L2 | L1 | L0 |
|---|---|---|---|
| A | 1 | 0 | - |
| B | - | 1 | 0 |
| C | 0 | - | 1 |

607

610

| L2 | L1 | L0 | BRANCH OF REPLACED WAY |
|---|---|---|---|
| 0 | 1 | X | A |
| X | 0 | 1 | B |
| 1 | X | 0 | C |

FIG. 6

CACHE WAY REPLACEMENT TECHNIQUE

FIELD

Embodiments of the invention relate to the field of cache memory architecture within a computer system. More specifically, the embodiments relate to cache memory way replacement within a cache memory or group of cache memories. For one embodiment, a least-recently used (LRU) cache way is identified in a cache memory having a non-binary number of cache ways.

BACKGROUND

Cache memory is used in computer systems in order to increase performance by alleviating the need for a processor to fetch data ("data" shall be used throughout to mean either computer instructions or operands upon which computer instructions operate) from main system memory sources, such as dynamic random-access memory (DRAM). DRAM and other main memory sources may require longer access times due to the paging and memory cell access speed of such memory sources, which can cause the processor to incur wait-states and degrade computer system performance.

Cache memory, on the other hand, provides the processor with a way to fetch data quickly without incurring the wait-states associated with main memory sources, such as DRAM. Using cache memory typically improves computer system performance by making commonly-used data available to the processor in a memory architecture that does not require paging cycles, that uses a relatively fast-access memory cell, and that places the cache in close proximity to the processor's local bus in order to reduce physical delay associated with bus structures.

The full performance benefits of using cache memory, however, can best be achieved by maintaining data within the cache memory that is most commonly used by the processor when executing a computer program. Therefore, data stored within a cache memory should constantly be monitored to determine when or if it should be replaced by data from a main memory source that is used more frequently.

Typically, cache memory is organized in "sets" or "ways" (hereafter collectively referred to as "ways"). A cache memory way typically comprises of a number of cache memory entry locations that have a common address. A set-associative cache is a type of cache memory that organizes data in cache ways that are assigned, or "mapped," to a particular location within a main memory sources, such as DRAM. A cache memory way is re-mapped when data stored within that way is replaced by data from another location within main memory. Furthermore, cache ways may be mapped to the same main memory location in order to help maintain in cache the most current version of data associated with a particular main memory location.

Traditionally, the number of ways in a set-associative cache has been a power of two. For example, a 4-way set-associative cache memory contains four ways, which is equal to $2^2$. Therefore, each cache memory way may be addressed by two bits. The cache memory's replacement policy may use a pseudo-LRU technique and a binary hierarchy encoding scheme, such as the one illustrated in FIG. 1.

Figure 1:
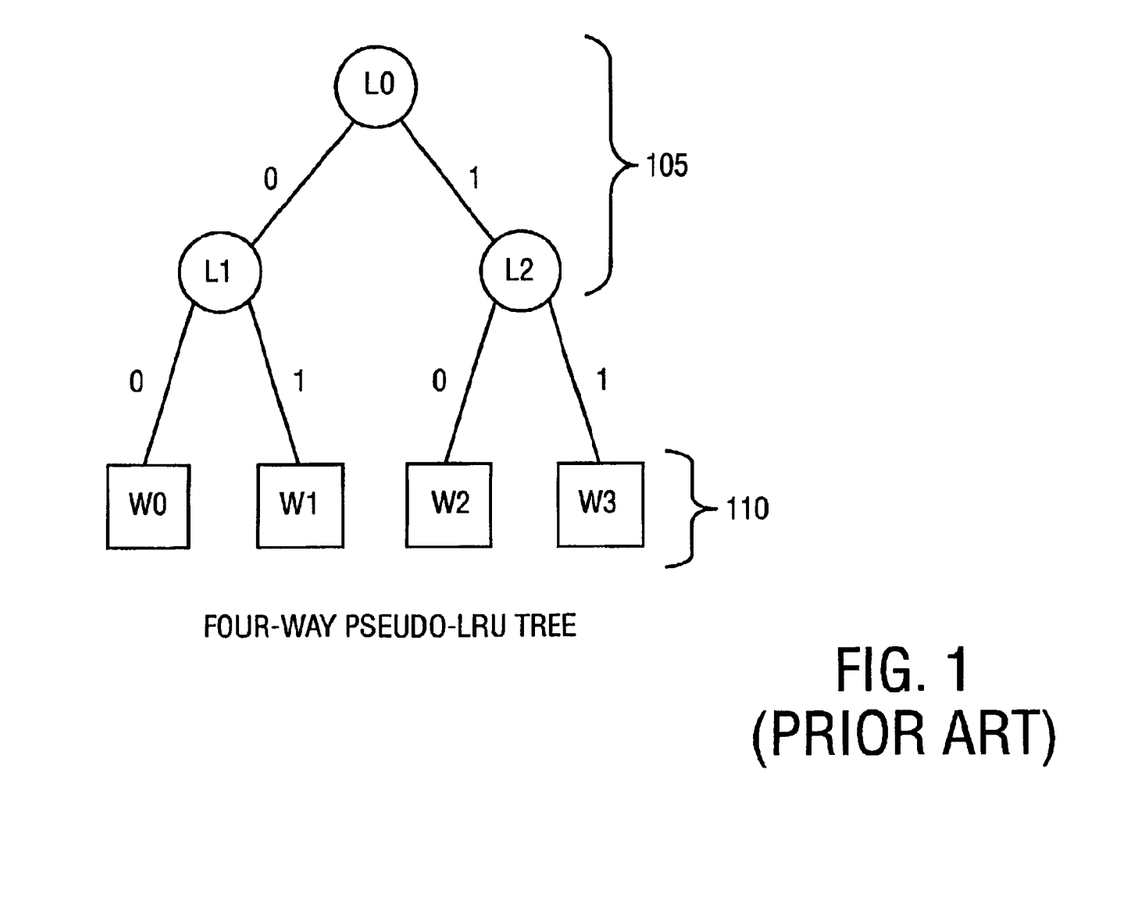
FIG. 1 illustrates a prior art cache way replacement technique.

FIG. 1 illustrates a cache memory encoding hierarchy comprises of nodes 105 and leafs 110. The leaves of the hierarchy represent individual cache ways. The nodes represent a bit of a vector representing a cache way. In particular, node values are either 0 or 1, which represent a path along the left or right branch from a node, respectively. In FIG. 1, circles, labeled with "L," indicate bits of the encoding hierarchy, and squares, labeled with "W," indicate cache ways.

When a way is accessed in a cache memory architecture, such as the that illustrated in FIG. 1, each node on the path traversed from the top of the hierarchy to the accessed way is updated, such that a bit indicates a non-followed branch of an accessed node. For example, if W2 is accessed, in FIG. 1, bits L0 and L2 are updated to 0 and 1, respectively. L1, in this example, is not updated and therefore retains an access "history" from a previous access. By updating nodes of the cache memory hierarchy in the manner described, a pseudo-LRU technique and binary hierarchy encoding scheme can be used to indicate which cache memory ways are least-recently used and are therefore candidates for replacement.

The encoding structure illustrated in FIG. 1, however, results in an uneven distribution of way replacement in cache memories that have a non-binary number of cache ways. The encoding structure illustrated in FIG. 1 applied to a cache memory with a non-binary number of cache ways is illustrated in FIG. 2.

Figure 2:
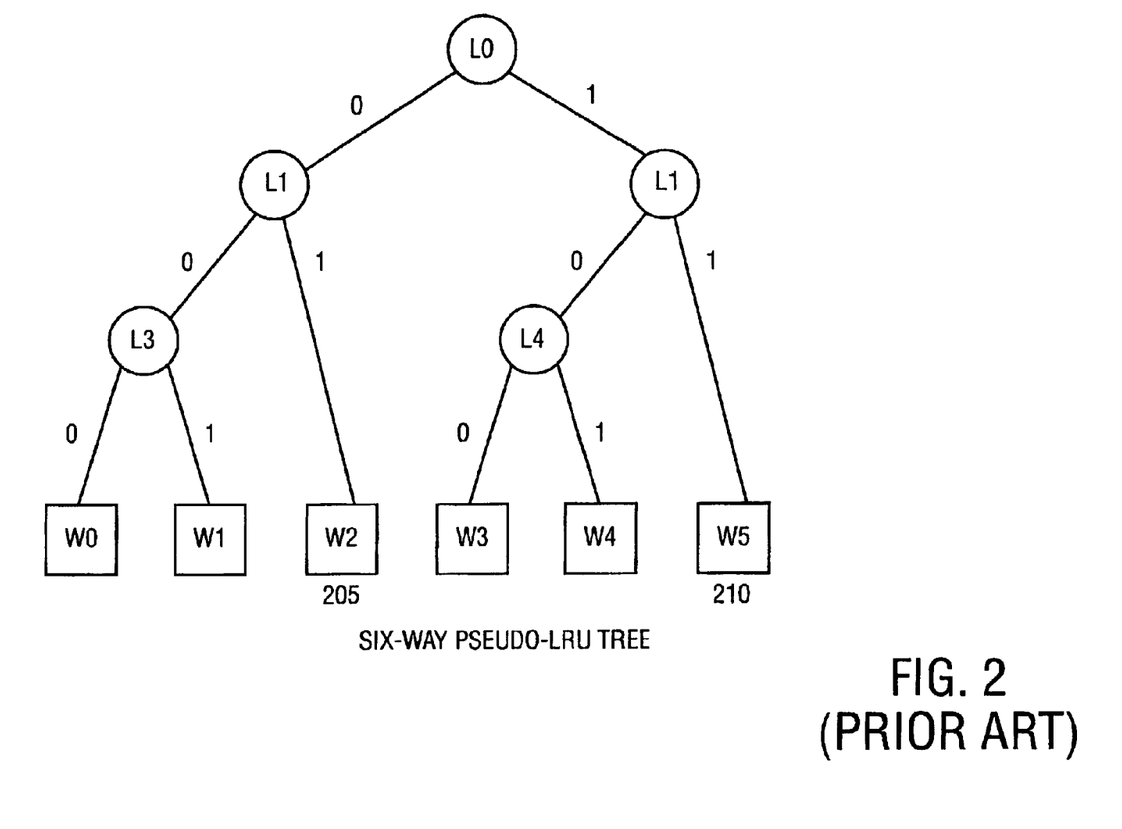
FIG. 2 illustrates a prior art cache way replacement technique of FIG. 1 applied to a non-binary number of cache ways.

The "unbalanced" hierarchy of the encoding structure illustrated in FIG. 2 may lead to an uneven distribution of cache way replacement when a pseudo-LRU cache way replacement technique is used to identify cache way replacement candidates. This is due to the fact that cache ways selected that are not part of a pair at the lowest level, such as W2 205 and W5 210, are replaced more often than those that are part of a pair. Uneven distribution of cache way replacement can result in cache ways being replaced that are not the least-recently used, thereby degrading performance of the computer system.

BRIEF DESCRIPTION OF THE DRAWINGS

Embodiments and the invention are illustrated by way of example and not limitation in the figures of the accompanying drawings, in which like references indicate similar elements and in which.

DETAILED DESCRIPTION

Embodiments of the invention described herein help achieve optimal performance within a computer system in which cache memory is used that may or may not contain a power-of-two (binary) number of cache ways by providing a balanced replacement algorithm. Advantageously, embodiments of the invention also enable an optimal cache size to be used for a particular design—including caches containing a non-binary number of cache ways—based on considerations, such as die size, circuit timing, performance, and power.

Furthermore, embodiments of the invention enable a substantially even distribution of cache way replacement throughout a cache or group of caches in order to help ensure that only least-recently used cache ways are replaced. Because embodiments of the invention use a combination of least-recently used (LRU) cache way identification techniques, a cache way to be replaced may not necessarily be the absolute least-recently used cache way at the time in which it is identified. Embodiments of the invention, however, are intended to identify cache ways that are used less frequently than would be identified by prior techniques, such as a pseudo-LRU cache way identification technique. Furthermore, embodiments of the invention are intended to yield substantially more uniform cache way replacement throughout a cache memory or group of cache memories than the prior art.

Finally, embodiments of the invention do not require a read-modify-write sequence to update a hierarchy of cache way identification nodes since the state of each node is determined by a cache way currently being accessed and not by a previous state of a node.

A cache way replacement technique is described herein that uses a true LRU cache way identification technique in conjunction with a binary LRU technique, such as a pseudo-LRU cache way identification technique, to identify a least-recently used cache way to be replaced. For one embodiment, the cache way replacement technique is used to identify and replace an LRU cache way within a cache containing a non-binary number of cache ways. The cache way replacement technique described herein, however, may be used in a cache containing any number of cache ways.

Figure 3:
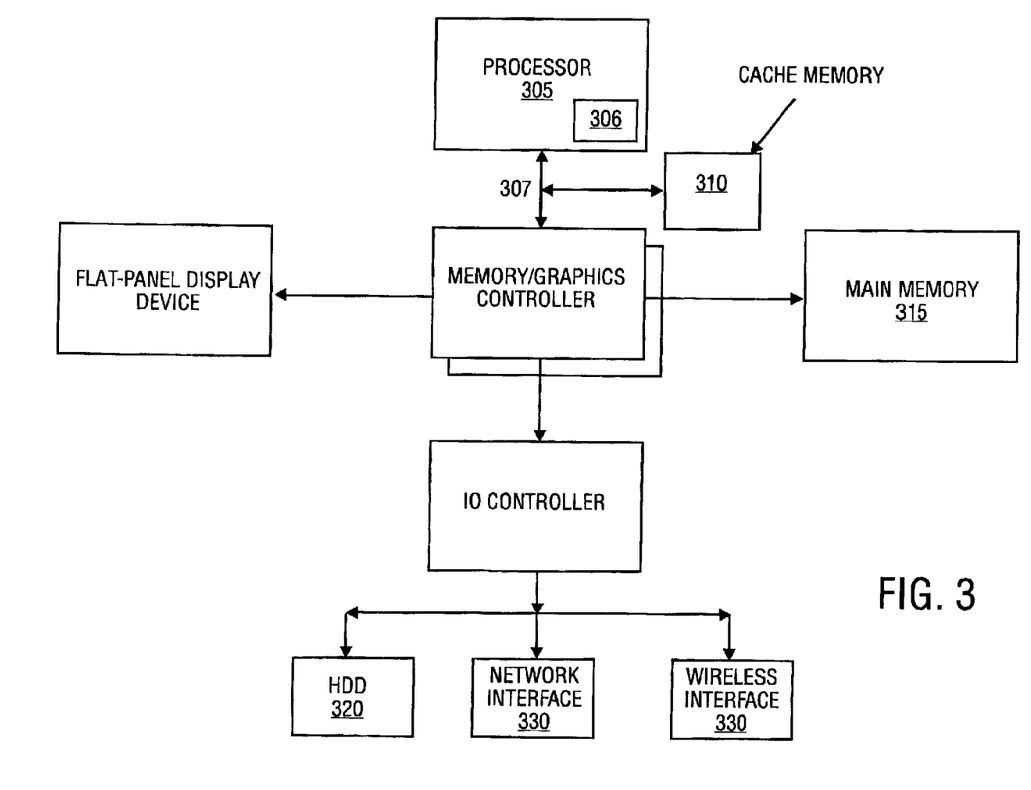
FIG. 3 illustrates a computer system in which at least one embodiment of the invention may be used.

FIG. 3 illustrates a computer system in which embodiments of the invention may be used. A processor 305 accesses data from a cache memory 310 and main memory 315. Illustrated within the processor of FIG. 3 is the location of one embodiment of the invention 306. However, embodiments of the invention may be implemented within other devices within the system, as a separate bus agent or cache, or distributed throughout the system. The main memory may be dynamic random-access memory (DRAM), a hard disk drive (HDD) 320, or a memory source 330 located remotely from the computer system containing various storage devices and technologies. The cache memory may be located either within the processor or in close proximity to the processor, such as on the processor's local bus 307. Furthermore, the cache memory may be comprised of relatively fast memory cells, such as a six-transistor (6T) cells, or other memory cells of approximately equal or faster access speed.

The cache memory is organized in cache ways, which may contain data that is infrequently used relative to other cache ways. Therefore, it is necessary to continuously identify LRU cache ways that are less frequently used, relative to other cache ways, and replace them with data from main memory.

Traditionally, cache memory is comprised of a binary number of cache ways (a number of ways equal to some power of 2). For example, a typical cache memory may contain 32,000 bytes (32 KB) of data. In this example, a cache memory may be organized in 32 ways of 1000 bytes (1 KB) each. Similarly, a cache memory may contain 64 KB of data organized as 64 ways of 1 KB each.

In the previous examples, each cache memory contains a binary (power of 2) number of ways: 32 being equal to $2^5$ and 64 being equal to $2^6$. In a computer system that requires less than 64 KB but more than 32 KB to function at optimal performance, however, cache may be wasted and system cost needlessly increased by using a cache containing a binary number of ways. Therefore, it may be desirable to use a cache memory containing a non-binary number of cache ways in order to more closely match the cache size needs of a particular computer system.

In systems containing cache memories of 48 KB, for example, one embodiment of the invention implements a technique to identify and replace an LRU cache way, as illustrated in FIG. 3. Although FIG. 3 illustrates a cache way replacement technique being implemented within the cache memory, it may also or instead be implemented in the processor in another embodiment. Furthermore, the cache memory may be contained within the processor and the cache way replacement technique may similarly be implemented within the processor in another embodiment. Other embodiments may implement the cache way replacement technique in other parts of the system.

The system illustrated in FIG. 3 may be a computer system or other system, such as a cellular phone, personal digital assistant, or other computing devices and systems.

Figure 4:
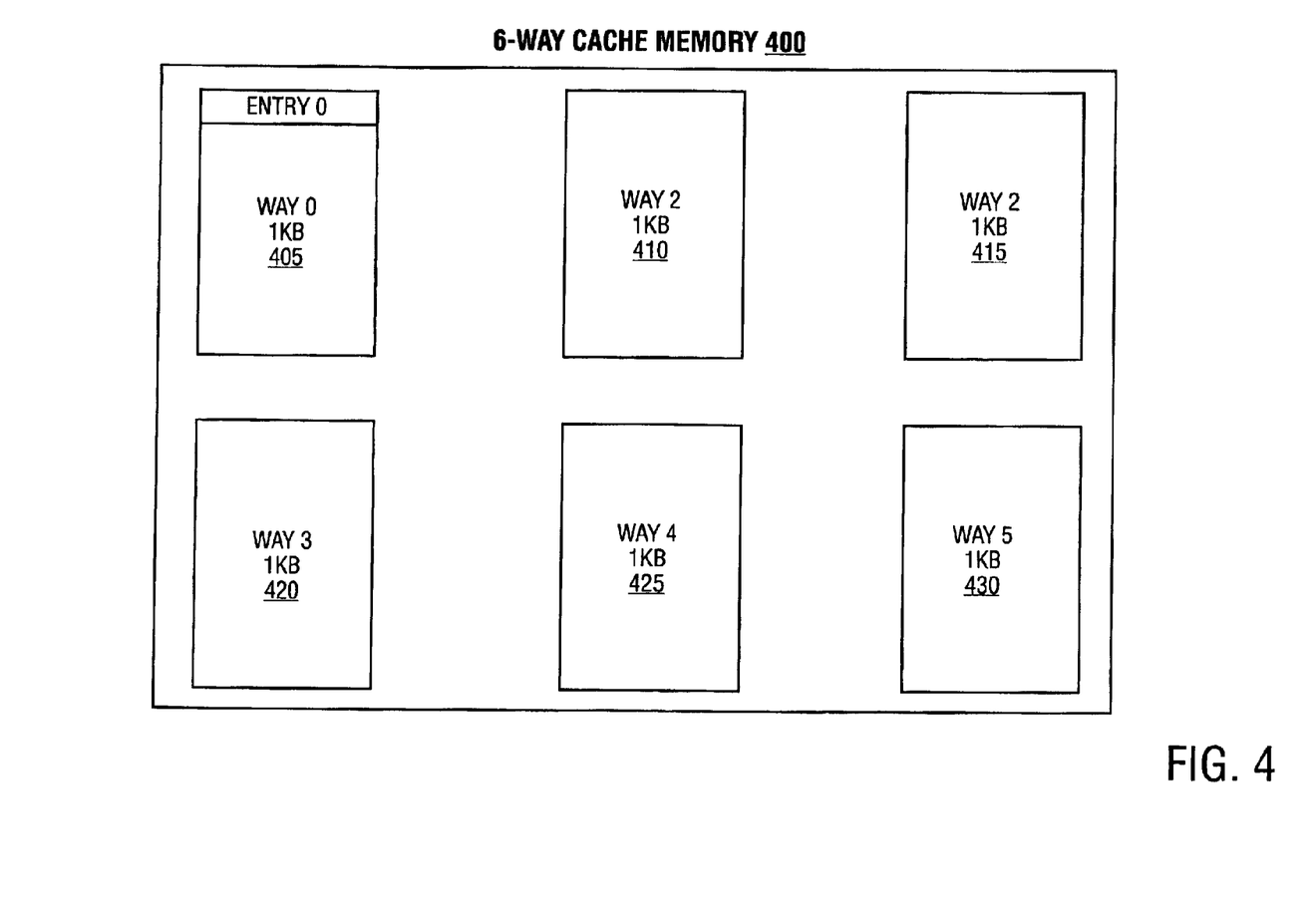
FIG. 4 illustrates one example of a cache memory that may be used in conjunction with one embodiment of the invention.

FIG. 4 illustrates an example of a cache memory that may be used in conjunction with one embodiment of the invention. The cache memory 310 of FIG. 4 may store up to 6 KB of data, organized in 6 ways 405, 410, 415, 420, 425, and 430 of 1 KB each, in order to optimally meet the performance needs of a computer system, such as the one illustrated in FIG. 3. Six is a non-binary (non-power of two) number of cache ways, however. Therefore, prior art techniques of identifying an LRU cache way, such as the pseudo-LRU cache way identification technique, may yield unevenly distributed cache way replacement throughout the cache memory, which may result in cache ways being replaced that are relatively frequently used.

The cache memory of FIG. 4 is one example of a cache memory that may be used in conjunction with embodiments of the invention. Larger cache memories, however, may be used that more appropriately fit the performance needs of high-performance microprocessors and computer systems. For example, a 48 KB cache memory organized as 48 ways of 1 KB each is used in conjunction with one embodiment of the invention. Because 48 is a non-binary number, embodiments of the invention may used in a computer system containing a cache memory containing 48 cache ways.

Figure 5:
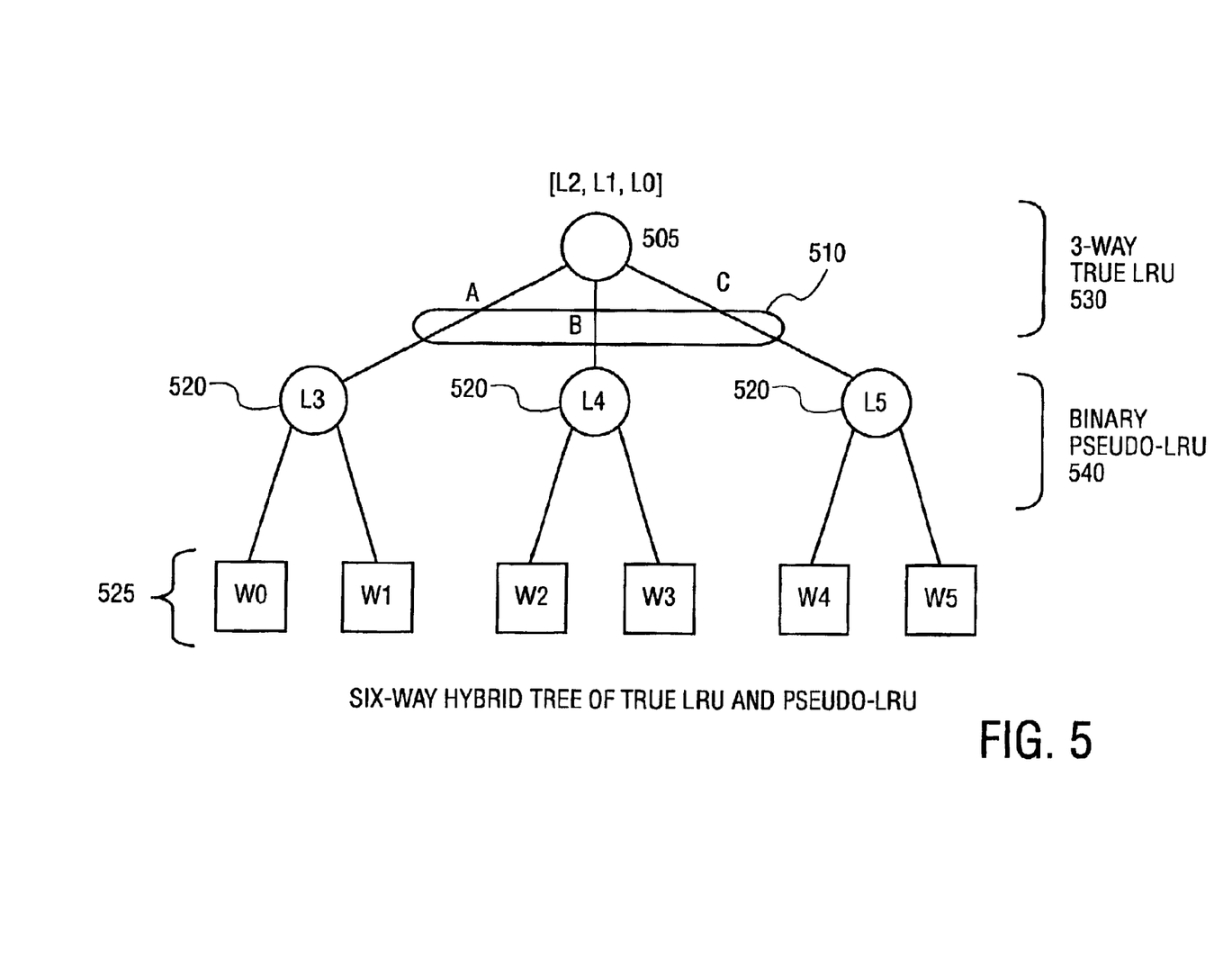
FIG. 5 illustrates a cache way replacement technique according to one embodiment.

FIG. 5 illustrates a cache way replacement technique according to one embodiment of the invention. The technique illustrated in FIG. 5 is meant to exemplify an embodiment of the invention that may be proliferated to larger or smaller caches having more or fewer cache ways than those illustrated in FIG. 5.

The technique illustrated in FIG. 5 includes a high-level node 505, which includes branches identifying three low-level nodes, which comprise branches 520 identifying two cache ways each 525. The high-level and low-level nodes form an identification hierarchy through which an LRU cache way may be identified and ultimately replaced.

For the embodiment illustrated in FIG. 5, a true LRU cache way identification technique 530 is used to identify a high-level node branch, and a pseudo-LRU cache way identification technique 540 is used to identify a low-level node branch in which an LRU cache way may be replaced. Together, the high and low-level identification information generated by the true LRU and pseudo-LRU cache way identification techniques, respectively, identify a cache way to be replaced that was not accessed immediately prior to the cache way being replaced.

The true LRU cache way replacement technique may use various methods to identify the proper high-level node branch corresponding to a cache way to be replaced, including look-up tables, mathematical and/or logical formulas, truth tables, etc. The true LRU cache way identification technique and the pseudo-LRU cache way identification technique may be implemented in various ways, including standard CMOS logic circuitry, software, or a combination thereof. Furthermore, these techniques may be implemented within a processor of a computer system, in the cache memory or cache memories to which it is applied, or in a discrete logic (in the case of a hardware implementation) or storage device (in the case of a software implementation).

Figure 6:
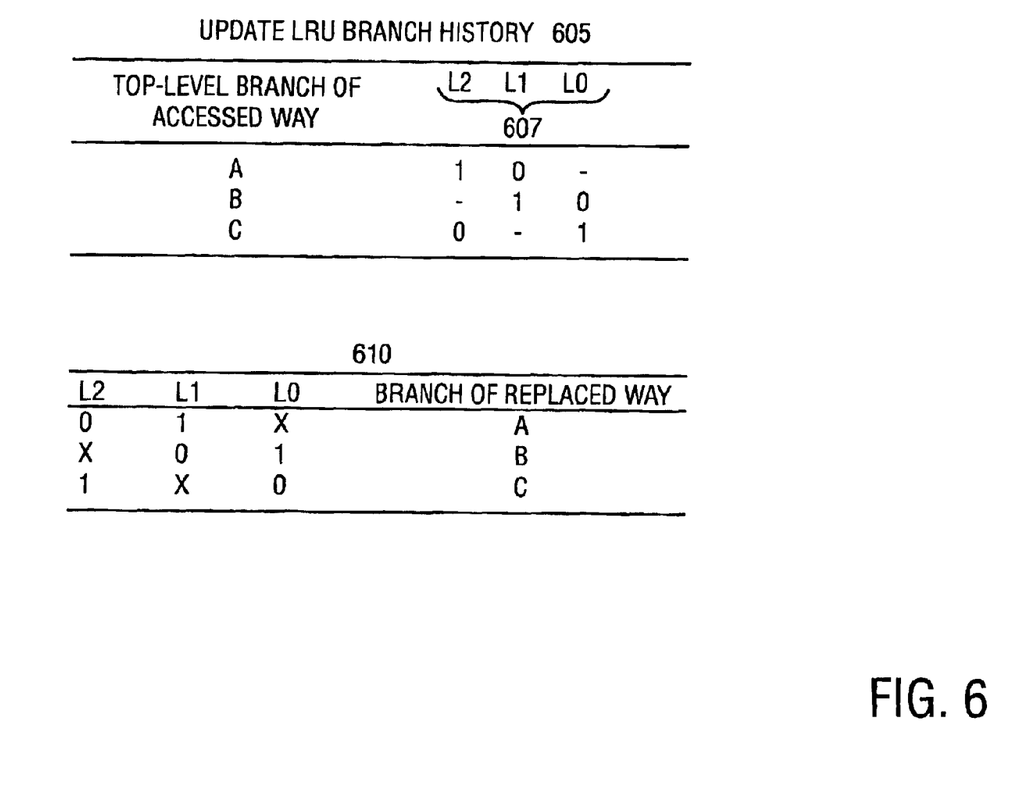
FIG. 6 illustrates an LRU branch history table and a select branch table according to one embodiment of the invention.

FIG. 6 illustrates an LRU branch history table 605 and a select branch table according to one embodiment of the invention. Three history bits 607 are used to identify a high-level node branch corresponding to a cache way to be accessed in the embodiment illustrated in FIG. 6. When a cache way is accessed, two bits from the set L2, L1, and L0 are updated according to the LRU branch history table, thereby maintaining a history of top-level node branches that have not recently been accessed.

In each case, the bit that is not updated (indicated by a "-" in the table) retains its previous value, which effectively maintains a history from recent prior accesses. When a cache way must be replaced, bits L0, L1, and L2 are used to select the high-level node branch corresponding to the cache way to be replaced according to the select branch table 610. For example, if history bits L2, L1, and L0 were equal to 011, a cache way from branch A would be replaced, because L0 is a "don't care."

In the embodiment illustrated in FIG. 5, low-level nodes of the hierarchy L3, L4, and L5 have two branches each. A pseudo-LRU cache way identification technique is used to identify the cache way to be replaced by updating the identification bits with each cache way access. In other embodiments, other LRU cache way identification techniques may be used to identify the low-level node branches corresponding to the cache way to be replaced.

At least one embodiment may be implemented using on a machine-readable medium, such as a magnetic disk, containing instructions (software), which when executed by a machine, such as a microprocessor, cause the machine to perform a method to carry out the embodiment.

In the foregoing specification the invention has been described with reference to specific exemplary embodiments. It will, however, be evident that various modifications and changes may be made thereto without departing from the broader spirit and scope of the invention. The specification and drawings are, accordingly, to be regarded in an illustration rather than a restrictive sense.

What is claimed is:

1. An apparatus comprising:
    a first unit to identify a cache way to be replaced among a non-binary number of cache ways;
    a second unit to perform a true least-recently used (LRU) cache way identification technique;
    a third unit to perform a pseudo-LRU cache way identification technique coupled to said second unit.

2. The apparatus of claim 1 further comprising a fourth unit to select said cache way to be replaced.

3. The apparatus of claim 1 wherein said second unit comprises a branch history update unit to update one or more branch history bits to help identify said cache way.

4. The apparatus of claim 3 wherein said cache way to be replaced was not accessed immediately prior to being replaced.

5. The apparatus of claim 4 wherein said non-binary number of cache ways are distributed throughout a plurality of cache memories.

6. The apparatus of claim 5 wherein said second and said third units form a hierarchy in which said second unit comprises a top-level node and said third unit comprises a node subordinate to said top-level node.

7. The apparatus of claim 6 wherein cache ways to be replaced are substantially evenly distributed throughout a said non-binary number of cache ways.

8. A method comprising:
    identifying a least-recently used (LRU) cache way, said LRU cache way being identified by performing a true LRU cache way identification technique and a pseudo-LRU cache way identification technique;
    replacing said LRU cache way.

9. The method of claim 8 wherein said true LRU way identification technique identifies a plurality of cache ways upon which to perform said pseudo-LRU way identification technique.

10. The method of claim 9 wherein said true LRU cache way identification technique comprises updating at least one branch history bit.

11. The method of claim 10 wherein said true LRU cache way identification technique comprises identifying a plurality of cache ways according to said at least one branch history bit.

12. The method of claim 11 wherein said true LRU cache way identification technique uses a plurality of branch history bits to identify a first cache way group among a plurality of groups of cache ways upon which to perform said pseudo-LRU cache way identification technique.

13. The method of claim 12 wherein said first cache way group is identified according to a branch history truth table.

14. The method of claim 9 wherein said identifying said LRU cache way comprises accessing a cache way within a hierarchy of nodes, said hierarchy of nodes comprising a top-level node and a low-level node.

15. The method of claim 14 wherein said true LRU cache way identification technique is performed on said top-level node and said pseudo-LRU cache way identification technique is performed on said low-level node.

16. The method of claim 15 wherein said true-LRU cache way identification technique identifies one among a plurality of nodes in which an LRU cache way exists and said pseudo-LRU cache way identification technique identifies said LRU cache way among a plurality of cache ways.

17. A processor comprising:
    circuitry to access a cache way among a non-binary number of cache ways;
    circuitry to identify a cache way to be replaced among said non-binary number of cache ways, said circuitry to identify comprising a true least recently used (LRU) cache way identification circuit and a pseudo-LRU cache way identification circuit coupled to said true LRU cache way identification circuit, said true LRU cache way identification circuit being able to use a plurality of history bits to identify a plurality of cache ways, among which said pseudo-LRU cache way identification circuit may identify said cache way to be replaced;
    circuitry to replace said cache way to be replaced.

18. The processor of claim 17 wherein said true LRU cache way identification circuit and said pseudo-LRU cache way identification circuit is able to identify a hierarchy of nodes, said hierarchy of nodes comprising a plurality of groups of a plurality of cache ways.

19. The processor of claim 18 wherein said true LRU cache way identification circuit is able to identify a high-level node branch which is able to identify a plurality of low-level nodes, among which, said pseudo-LRU cache way identification circuit is able to identify said cache way to be replaced.

20. The processor of claim 19 wherein said true LRU cache way identification circuit is able to identify a low-level node among said plurality of low-level nodes that is not accessed by said circuitry to access.

21. The processor of claim 20 wherein said true LRU cache way identification circuit uses history bits to identify said low-level node among said plurality of low-level nodes.

22. The processor of claim 21 wherein said true LRU cache way identification circuit is able to identify a low-level node among said plurality of low-level nodes that is accessed by said circuitry to access.

23. The processor of claim 22 wherein said pseudo-LRU cache way identification circuit is able to identify a low-level node among said plurality of low-level nodes comprising said cache way to be accessed.

24. The processor of or of claim 23 wherein said cache way to be replaced is not a cache way accessed immediately prior to being replaced.

25. A system comprising:
a processor;
a non-binary number of cache ways coupled to said processor;
a least recently used (LRU) cache way identification circuit, said LRU cache way identification circuit to identify an LRU cache way among the cache ways by using a circuit to identify a true LRU cache way and a circuit to identify a pseudo-LRU cache.

26. The system of claim 25 wherein said circuit to identify said true LRU cache way is able to identify a plurality of cache ways, among which said circuit to identify said pseudo-LRU cache way is able to identify a cache way to be replaced.

27. The system of claim 26 wherein said circuit to identify said true LRU cache way and said circuit to identify said pseudo-LRU cache way are able to identify said cache way to be replaced when said non-binary number of cache ways are accessed by said processor.

28. The system of claim 27 wherein said circuit to identify said true LRU cache way is able to identify said plurality of cache ways using a plurality of history bits, said history bits being updated when said non-binary number of cache ways are accessed by said processor.

29. The system of claim 28 wherein cache ways to be replaced are substantially evenly distributed among said non-binary number of cache ways.

30. The system of claim 29 wherein said non-binary number of cache ways are distributed among a plurality of cache memories within said system.

31. A machine-readable medium having stored thereon a set of instructions, which when executed by a machine causes said machine to perform a method comprising:
accessing a cache way;
identifying a high-level node branch comprising performing a pseudo-least recently used (LRU) cache way identification technique including identifying a low-level node branch to which a least recently used (LRU) cache way corresponds, said high-level node branch being identified using a true-LRU cache way identification technique wherein the high-level node branch is to be identified using a plurality of history bits according to a truth table.

32. The machine-readable medium of claim 31 wherein said plurality of history bits are updated according to said cache way being accessed.

33. The machine-readable medium of claim 32 wherein a high-level node branch not identified by said history bits as corresponding to a cache way being accessed is identified as high-level node branch corresponding to said LRU cache way.

34. An apparatus comprising:
means for identifying a cache way to be replaced among a non-binary number of cache ways, comprising;
first means for performing a true least-recently used (LRU) cache way identification technique;
second means for performing a pseudo-LRU cache way identification technique coupled to said first means.

35. The apparatus of claim 34 further comprising a means for selecting said cache way to be replaced.

36. The apparatus of claim 34 further comprising a means to update a branch history comprises a branch history in order to help identify said cache way.

37. The apparatus of claim 36 wherein said cache way to be replaced is not accessed immediately prior to being replaced.

38. The apparatus of claim 37 wherein said non-binary number of cache ways are distributed throughout a plurality of cache memories.

39. The apparatus of claim 38 wherein said first and said second means for performing a cache way identification technique form a hierarchy in which said first means comprises a top-level node and said second means comprises a node subordinate to said top-level node.

40. The apparatus of claim 39 wherein cache ways to be replaced are substantially evenly distributed throughout a said non-binary number of cache ways.

* * * * *